United States Patent Office 3,366,687
Patented Jan. 30, 1968

3,366,687
PROCESS FOR PREPARING PRIMARY AND SECONDARY AMINES
Alan F. Ellis, Johann G. D. Schulz, and Arthur C. Whitaker, Pittsburgh, Pa., assignors to Gulf Research & Development Company, Pittsburgh, Pa., a corporation of Delaware
No Drawing. Continuation-in-part of application Ser. No. 374,275, June 11, 1964. This application Feb. 8, 1965, Ser. No. 431,175
8 Claims. (Cl. 260—583)

ABSTRACT OF THE DISCLOSURE

A process for reacting an amine with an alcohol in the presence of a nickel, cobalt or copper chromite catalyst to obtain the next higher substituted amine than the charge amine.

---

This application is a continuation-in-part application of our application Ser. No. 374,275 for Process filed June 11, 1964.

This invention relates to a process for reacting an amine selected from the group consisting of ammonia, a primary amine and a second amine with a secondary alcohol and a process for reacting an amine selected from the group consisting of a primary amine and a secondary amine with a primary alcohol to obtain the next higher substituted amine than said charge amine.

The reaction of ammonia, a primary amine and/or a secondary amine with a primary and/or a secondary alcohol is known. Such reactions, however, require high temperatures and high pressures in order to obtain a relatively high yield of tertiary amines. Under such severe conditions there is a great tendency for the alcohols employed to be converted not only to desired amine but also to undesirable condensation and/or decomposition products. Operating under the conditions of the process defined and claimed herein, we have found that we can carry out our desired reaction under relatively mild conditions to obtain a high efficiency to tertiary amines.

The primary or secondary alcohol employed herein can be defined by the following general formula:

$$R^1R^2CHOH$$

wherein $R^1$ can be selected from the group consisting of hydrogen, alkyl radicals having from one to 18 carbon atoms, preferably from eight to 14 carbon atoms, such as methyl, ethyl, isopropyl, 2,3-dimethylbutyl, cyclohexyl, decyl, 4-methyldecyl, 5,5,7,7-tetramethyloctyl, tridecyl, hexadecyl, 15,15-dimethylhexadecyl, etc.; aralkyl radicals having from seven to 24 carbon atoms, preferably from 14 to 20 carbon atoms, such as, benzyl, 2-phenylethyl, cumyl, 4-phenylhexyl, 8-phenyl, 3-methyloctyl, 3-tolyldecyl, 16-phenylhexadecyl, 8-xylyloctadecyl, etc.; or aryl radicals having from six to 14 carbon atoms, preferably from six to eight carbon atoms, such as phenyl, tolyl, xylyl, naphthyl, phenanthryl, anthryl, p-methoxyphenyl, m-nitrophenyl, p-sulfoxyphenyl, o-hydroxyphenyl, etc., and $R^2$ is selected from the group consisting of alkyl, aralkyl and aryl radicals defined by $R^1$. In no event should the number of carbon atoms in the alcohol charge total less than three or more than 19.

Ammonia, as noted, can be employed in the reaction with a secondary alcohol, but not effectively with a primary alcohol. The primary amine that can be employed to react with the alcohol defined above can be defined by the following general formula:

$$R^3NH_2$$

wherein $R^3$ is a radical defined by $R^2$ above. Examples of such amines that can be employed include methylamine, ethylamine, isopropylamine, butylamine, aniline, benzylamine, etc. The secondary amine that can be employed to react with the alcohol defined above can be defined by the following general formula:

$$R^4R^5NH$$

wherein $R^4$ and $R^5$ are radicals selected from the group of radicals defined by $R^2$ above. Examples of such amines that can be employed include dimethylamine, diethylamine, dibutylamine, butylisopropylamine, diphenylamine, dibenzylamine, etc.

In the reaction of ammonia with a secondary alcohol, a primary amine defined by the following general formula:

$$R^1R^2CHNH_2$$

and water are obtained. Examples of primary amines obtained include isopropylamine, 2-butylamine, cyclohexylamine, 4-octylamine, 3-decylamine, etc.

In the reaction of a primary amine with a secondary alcohol, a secondary amine defined by the following general formula:

$$R^1R^2CHNHR^3$$

and water are obtained. Examples of secondary amines obtained include isopropylmethylamine, 2-butylpropylamine, 2-octylmethylamine, 5-decylpropylamine, 2-hexadecylethylamine, etc.

In the reaction of a secondary amine with a secondary alcohol, a tertiary amine defined by the following general formula:

$$R^1R^2CHNHR^3R^4$$

and water are obtained. Examples of tertiary amines obtained are isopropyldimethylamine, cyclohexyldiethylamine, 2-octylethylmethylamine, 2-dodecyldibenzylamine, etc.

In the reaction of a primary amine with a primary alcohol, a secondary amine defined by the following general formula:

$$R^2CH_2NHR^3$$

and water are obtained. Examples of secondary amines obtained are propylmethylamine, dibutylamine, octylethylamine, dibenzylamine, tridecylmethylamine, etc.

In the reaction of a secondary amine with a primary alcohol a tertiary amine defined by the following general formula:

$$R^2CH_2NR^3R^4$$

and water are obtained. Examples of tertiary amines obtained are hexyldiethylamine, octyldimethylamine, benzylethylmethylamine, tetradecyldipropylamine, etc.

The reaction of the above amines with the above alcohol must be carried out in accordance with our process in the presence of nickel, cobalt or a copper chromite catalyst, such as barium-promoted copper chromite. The nickel metal can be employed as such, for example, as Raney nickel, or it can be mounted on a support, such as kieselguhr, silica-alumina, carbon, etc. Similarly, the cobalt metal or copper chromite can be employed as such or it can be mounted on a similar support. The barium-promoted copper chromite can be composed of about five to about 12 percent by weight of barium and about 30 to about 60 percent by weight of copper chromite.

The amount of catalyst required relative to the reactant alcohol that is charged to the reaction system is at least about one mol percent thereof and in some cases can be as high as about 300 mol percent thereof. In general, we prefer about 20 to about 200 mol percent of catalyst relative to the alcohol in the reaction zone.

While we are not certain we believe the reaction herein initially involves the dehydrogenation of the primary or secondary alcohol employed to the corresponding aldehyde or ketone, respectively. The aldehyde or ketone so obtained then reacts with the reactant amine and hydrogen produced in the above dehydrogenation, resulting in the production of the desired higher amine and water. Since it is known that ammonia will react with an alcohol at temperatures ranging from 165° to 190° C. to form an amine, and that a secondary amine is far less reactive than ammonia, it would have been expected that temperatures in excess of 165° to 190° C. would be required for the reaction defined herein. Instead we have found that unexpectedly the present reaction can be carried out effectively with high efficiency to desired tertiary amine at a temperature of about 75° to about 200° C., preferably from about 115° to about 160° C. Because we are able to operate our process at relatively mild temperatures we are able to obtain the additional benefit of producing relatively small amounts of condensation and/or decomposition products. Although the reaction can be made to go at superatmospheric pressures and high temperatures, we find that our process works best at atmospheric pressure. Since we believe that the water produced during the process may have a tendency to inhibit the desired reaction, we believe the advantage of operation at atmospheric pressure resides in the fact that this allows the water formed in the reaction to escape from the reaction zone.

The amount of reactant amine that must be in contact with the reactant alcohol during the course of the reaction is critical. The minimum amount of reactant amine required to be in contact with the alcohol is at least the amount stoichiometrically required to react with the reactant alcohol capable of reacting therewith under the conditions of the reaction. Preferably, the amount of amine in contact with the reactant alcohol should not be more than four times the amount stoichiometrically required to react with the alcohol capable of reacting therewith. Best results are obtained, however, when the amount of reactant amine in contact with the alcohol is from the stoichiometric amount to about twice the stoichiometric amount required to react with the alcohol capable of reacting therewith. It might normally be expected that the amount of reactant amine in contact with the alcohol capable of reacting therewith might reasonably affect the rate of conversion thereof to desired higher amine but would have no other undesirable effect. As noted, however, we believe that initially the reactant primary or secondary alcohol is dehydrogenated to the corresponding aldehyde or ketone, respectively, and it is the aldehyde or ketone so obtained that reacts with the reactant amine to form the desired next higher substituted amine than the defined reactant amine. In order to obtain high efficiency to desired amine in accordance with the procedure defined herein it is imperative that as the alcohol becomes converted to aldehyde or ketone, and therefore becomes capable of reacting with the reactant amine to form the desired higher amine, it is necessary that the amount of amine in contact with the alcohol charge capable of reacting therewith be within the ranges defined above so that it can react with the aldehyde or ketone that has been formed. If the amount of reactant amine is blow the amounts defined above, the unreacted aldehyde or ketone as it is formed will condense with itself, catalyzed by amine, to obtain undesirable condensation products. If amounts in excess of the amounts defined above are employed, the excess reactant amine will remain unreacted and will merely serve as a diluent in the reaction zone. Since the alcohol, or aldehyde or ketone formed by dehydrogenation, and reactant amine will react with each other in approximately equal molar amounts, under ideal conditions, we prefer therefore to have present in the reaction zone reactant amine in equal molar amounts relative to the alcohol capable of reacting therewith.

The contact time, or the total time the reactant alcohol, reactant amine and catalyst are in contact with each other at the reaction temperature, can be from about five minutes to about 24 hours, preferably from 30 minutes to about seven hours.

We have additionally found that while good results are obtained by proceeding as described hereinabove, higher yields and better efficiencies are obtained when a small amount of hydrogen is added to the reaction system. As noted, while we are not certain we believe that the present procedure involves dehydrogenation of the reactant alcohol to produce hydrogen and the subsequent reuse thereof in the production of the desired higher amine. We believe that as the reaction progresses, particularly under the preferred embodiment of our invention at atmospheric pressure, some of the hydrogen is lost and is not therefore available for use in the desired reaction. The addition of a small amount of hydrogen to the reaction system tends to offset the loss of hydrogen so described. In general, the amount of hydrogen added to the reaction system need not exceed about one-third mol per mol of alcohol charged to the reaction system, but preferably will be about 0.1 to about 0.3 mol per mol of such alcohol.

The reaction defined herein is relatively simple and merely involves bringing the reactant alcohol in contact with the reactant amine in the presence of catalyst under the conditions as defined hereinabove. Since the reactant amine employed herein is gaseous at atmospheric pressure a particularly effective method involves passing the alcohol and reactant amine concurrently upwardly through an elongated reaction zone packed with catalyst. Alternatively, alcohol can be passed downwardly through such a reactor while the amine is flowed upwardly therethrough countercurrent to the flow of said alcohol.

Any suitable procedure can be employed in recovering the desired higher amine. At the end of the reaction, the water, any hydrogen that may be present, and unreacted amine charge, if present, are merely flashed from the reaction system. From the remaining product mixture, after separation from the heterogeneous catalyst, there can be removed by distillation successively ketone or aldehyde, unreacted alcohol, if present and desired higher amine. Left behind in the distillation pot are the condensation and heavier products.

The invention can further be illustrated by the following:

EXAMPLE I

A mixture of 100.0 grams (0.77 mol) of 2-octanol and 5.0 grams of Girdler G 49 B nickel catalyst (containing 50 percent by weight of nickel) was placed in a 250 millimeter flask having an internal diameter of 75 millimeters and equipped with a stirrer, a gas sparger and a Dean-Stark trap condenser arrangement. The mixture was heated to a slow reflux (160° to 170° C.) for six hours while a hydrogen-dimethyl amine gas mixture was flowed upwardly therethrough at a rate of appromixately one mol per hour of each. Gas chromatographic analysis of the resulting mixture indicated only at 28 percent efficiency to the desired 2-octyldimethyl amine at a conversion level of 88 percent.

EXAMPLE II

Since the procedure defined in Example I is effective to react ammonia with an alcohol, and a secondary amine is less reactive than ammonia, it might be expected that the procedure of Example I might be more effective using more severe conditions, for example, elevated pressures. Accordingly, a mixture of 130 grams (one mol) of 2-octanol and two grams of Girdler G 49 B nickel catalyst was charged to a one-liter autoclave and heated at 170° C. for 30 minutes. Then 30 milliliters (one mol) of dimethylamine was added to the reactor and the reaction continued for two hours at 170° to 180° C. and 100 pounds per square inch gauge. Gas chromatographic analysis of the resulting mixture indicated no reaction had occurred.

EXAMPLE III

An attempt to improve the procedure of Example I by maintaining the alcohol and reactant amine in contact with each other for a longer period of time proved fruitless as evidenced by the following. A charge of 400 milliliters of 2-octanol was reacted with dimethylamine in a countercurrent flow vertical tower 43 inches long and three-fourths inch in diameter packed with 458 grams of Girdler G-52 nickel catalyst (containing 30 percent by weight of nickel) and equipped for recycle of the liquid products. The dimethylamine-hydrogen mixture was injected into the bottom of the tower at a rate of 0.5 mol per hour of each gas. The reactor was heated to 150° to 160° C. and the 2-octanol was pumped into the top of the tower at a rate fast enough to allow efficient recycle. The reaction was run for five hours at atmospheric pressure and the effluent was analyzed by gas chromatography every hour. The final product composition indicated a 2-octyldimethyl amine efficiency of only eight percent at a conversion level of 97 percent.

EXAMPLE IV

In this example an attempt was made to operate at high temperatures and pressures in the presence of a catalyst alleged to be effective under such conditions. While the results obtained were somewhat improved over those obtained above, they remained unsatisfactory. Thus, a mixture of 100 milliliters (0.63 mol) of 2-octanol, 27 milliliters (0.9 mol) of dimethylamine and 10 grams of barium-promoted copper chromite containing 11 percent by weight of barium, 31 percent by weight of chromium and 20 percent by weight of copper was charged to a one-liter autoclave and pressured with 100 pounds per square inch gauge of hydrogen. The reactor was heated to 200° to 230° C. and 350 to 400 pounds per square inch gauge for three hours. Gas chromatographic analysis of the product mixture indicated a 2-octyldimethylamine efficiency of 41 percent at a conversion level of 64 percent.

EXAMPLE V

To determine whether or not repeating the run of Example IV at lower temperature levels would produce improved results the following was done. A mixture of 200 milliliters (1.2 mols) of 2-octanol, 50 milliliters (1.6 mols) of dimethylamine and 10 grams of the barium-promoted copper chromite was charged to a one-liter autoclave and pressured with 100 pounds per square inch of hydrogen. The reactor was heated at 130° C. and 200 to 250 pounds per square inch gauge for three hours. Gas chromatographic analysis of the product mixture indicated a 2-octyldimethylamine efficiency of 58 percent at a conversion level of 10 percent. While the efficiency herein was somewhat in excess of that obtained in Example IV, the conversion was far less. From a study of Examples IV and V it would appear the catalyst employed therein would require elevated temperatures of at least about 230° C. or even higher to obtain good efficiencies.

EXAMPLE VI

The procedure of Example III was also repeated at a lower temperature, and, unexpectedly and desirably, excellent results were obtained. Thus, the procedure of Example III was followed with 300 milliliters of 2-octanol and gas flows of 0.7 mol per hour of dimethylamine and one mol per hour of hydrogen. The reactor was heated to 125° to 130° C. and the reaction was run for five hours. Analysis of the final product effluent by gas chromatography indicated a 2-octyldimethylamine efficiency of 71 percent at a conversion level of 95 percent. This result is completely unexpected, since the result of Example III would appear to indicate the use of a temperature in excess of the 150° to 160° C. employed therein. This is so because, as stated, ammonia will react well with an alcohol at the latter temperature to form a product amine. Since a secondary amine is less reactive than ammonia, it would have been predicated that a secondary amine substituted for ammonia would require a higher temperature, not a lower temperature as we have found.

EXAMPLE VII

Additional runs were made using the same reactor employed in Example VI but in which both the alcohol and dimethylamine, with and without hydrogen, were flowed concurrently upwardly therethrough. The reactor was packed with 458 grams of Girdler G-52 nickel catalyst or an equivalent amount of one of the other defined catalysts. The data obtained are tabulated below in Table I.

TABLE I

| Run No. | Average Reactor Temperature, °C. | Alcohol Employed | Flow Rates, Mols Per Hour | | | Average Contact Time Between Alcohol and Amine, Hours | Mol Percent Conversion of Amine | Efficiency to Product Amine |
|---|---|---|---|---|---|---|---|---|
| | | | Amine | Alcohol | Hydrogen | | | |
| 1 | 130 | 2-octanol | 1.34 | 0.62 | None | 0.61 | 65 | 73 |
| 2 | 130 | do | 1.60 | 0.63 | 0.2 | 0.61 | 64 | 84 |
| 3 | 130 | do | 1.53 | 0.22 | None | 5.1 | 83 | 82 |
| 4 | 130 | 1-dodecanol | 1.10 | 0.26 | 0.2 | 3.2 | 80 | 57 |
| 5 | 130 | 2-octanol | 0.94 | 0.23 | 0.2 | 5.2 | 75 | 96 |
| 6 | 130 | do | 1.70 | 0.21 | 0.2 | 5.7 | 72 | 91 |
| 7 | 130 | 1-octanol | 1.10 | 0.28 | 0.2 | 4.0 | 24 | 59 |
| 8 | 150 | C$_{10}$ Oxo (Branched Preliminary Alcohols) | 1.55 | 0.20 | 0.20 | 4.5 | 28 | 79 |
| 9 | 160 | do | 1.48 | 0.14 | 0.1 | 5.1 | 45 | 90 |
| 10 | 130 | 1-octanol | 1.34 | 0.25 | 0.2 | 4.0 | 16 | 12 |

In the above table Runs Nos. 1, 2, 3, 4, 8 and 9 involved the use of dimethyl amine as reactant. In Runs Nos. 5 and 7 the amine used was methyl amine, while in Runs Nos. 6 and 10 ammonia was reacted with the alcohol. The catalyst employed in Runs Nos. 1 through 6, inclusive, was a Girdler G-52 nickel catalyst, while in Runs Nos. 7, 8, 9 and 10 the catalyst was Harshaw Cu-1107T, a barium-promoted copper chromite with a composition of 10 percent barium oxide, 41 percent copper oxide and 46 percent chromium oxide which is similar to the barium-promoted copper chromite catalyst employed in Examples IV and V. In each instance the product amine was one having one more alkyl substituent than the reactant amine.

The data above further illustrates the efficiency of our process. Note in particular that although good results were obtained in Run No. 1 even better results were obtained in Run No. 2 when a small amount of hydrogen was also added to the reaction system. In Run No. 3 when the average contact time between the alcohol and the reactant amine was lengthened to the point wherein there was a greater amount of conversion of reactant amine to desired product, product efficiency was greatly improved.

The above table further illustrates the fact that barium-promoted copper chromite is effective in the defined reaction at atmospheric pressure. In the runs wherein a primary alcohol was employed, the conversion level was relatively low compared to the runs wherein a secondary alcohol was employed even at a higher operating temperature. This is due to the fact that primary alcohols dehydrogenate less easily than secondary alcohols. As noted the reaction defined herein requires that initially the alcohol be dehydrogenated prior to reaction with the defined amine. However, in each instance wherein a primary alcohol was employed, except in Run No. 10, good yields to desired product amine was obtained. That ammonia will not react effectively with a primary alcohol in the present context is apparent from Run No. 10 wherein low conversion and low yield were obtained.

EXAMPLE VIII

In order to study the effect of higher temperature on the reaction the following runs were made in a reactor 14 inches long having an internal diameter of one-half inch. In the following runs a charge of 180 milliliters of o-dodecanol was placed in the reactor together with 50 grams of Girdler G-52 nickel catalyst. The dimethylamine was continuously injected into the base of the reactor. A Dean-Stark trap was employed to remove the excess dimethylamine and water from the system. The data obtained are tabulated below in Table II.

TABLE II

| Run No. | Average Reactor Temperature, °C. | Flow Rates, Mols Per Hour Dimethyl Amine | Average Contact Time Between Alcohol and Amine, Hours | Mol Percent Conversion of Amine | Efficiency to Product Amine |
|---|---|---|---|---|---|
| 5 | 130 | 2.0 | 2 | 20 | 85 |
| 6 | 170 | 2.0 | 2 | 68 | 55 |

The data of Table II further illustrate the advantages of operating in accordance with the procedure of this invention. In the reactor employed, a sufficiently long contact time was difficult to obtain, and accordingly at the low temperature level a low conversion was obtained. However, the efficiency to the desired tertiary amine was high. At a higher temperature level the conversion of amine was increased, although the efficiency to desired tertiary amine was not as high as in Run No. 6. For such reason, therefore, while we can employ a temperature as high as about 200° C. we prefer to employ a temperature on the order of about 115° to about 160° C. for high efficiency to tertiary amine.

Additional runs were made wherein a tube 35 centimeters long and having an internal diameter of 1.5 centimeters was packed with 70 grams of one of two catalysts. The tower was heated to 130°–135° C. and maintained at atmospheric pressure while dimethylamine at the rate of 45 grams per hour was passed upwardly therethrough over a period of two hours. The cobalt catalyst used was composed of 31 percent cobalt on alumina and the barium-promoted copper chromite was composed of 11 percent barium, 20 percent copper and 32 percent chromium. The resulting organic products were analyzed by gas chromatography for desired tertiary amine. The results are tabulated below in Table III.

TABLE III

| Run No. | Alcohol | Catalyst | Percent Conversion | Percent Amine Efficiency |
|---|---|---|---|---|
| 1 | 2-octanol | Cobalt | 47 | 57 |
| 2 | 1-octanol | do | 28 | 92 |
| 3 | 2-octanol | Barium-promoted Copper Chromite | 51 | 66 |
| 4 | 1-dodecanol | do | 33 | 82 |

EXAMPLE IX

As pointed out above, we believe the reaction defined herein involves the dehydrogenation of the primary or secondary alcohol employed to the corresponding aldehyde or ketone, respectively, and the latter so obtained then reacts with the reactant amine to obtain the desired amine compound. The following series of runs illustrate the fact that nickel, cobalt and barium-promoted copper chromite are effective to dehydrogenate alcohols and are suitable catalysts for use in the process defined and claimed herein, whereas many other metals or compounds are not effective to dehydrogenate alcohols and would be suitable for use herein. Thus, we placed five grams of the defined metal or compound in a 100 milliliter round bottom flask equipped with a condenser together with 42 grams of 2-octanol and heated the same to reflux (177°–178° C.) and monitored the amount of hydrogen evolved with a wet-test meter for a period of 2.5 hours. The data obtained are tabulated below in Table IV.

TABLE IV

| Run No. | Catalyst | Main Catalyst Component | Dehydration Rate, Millimols Hydrogen Per Hour |
|---|---|---|---|
| 1 | Girdler G-52 Nickel | 30% Ni | 33 |
| 2 | Co-X-L-1847 Cobalt | 31% Co | 25 |
| 3 | Barium-promoted Copper Chromite | 11% Barium, 31% Chromium, 20% Copper | 142 |
| 4 | Palladium on Carbon | 4 | 0 |
| 5 | do | 25 | 0 |
| 6 | Platinum | 100 | 0 |
| 7 | ZnO | 100 | |
| 8 | Al$_2$O$_3$ | 100 | 0 |
| 9 | MgO | 100 | 0 |
| 10 | Ni-Co-Mo | 11% Molybdenum, 2% Cobalt, 1% Nickel | 0 |

The tertiary amines obtained herein can be employed, for example, in the production of amine oxide detergents. These amine oxides can be prepared by oxidation of the corresponding tertiary amines with, for example, hydrogen peroxide or ozone at room temperature. Tertiary amines may also be used as epoxy curing agents. The primary and secondary amines obtained herein can be employed, for example, as corrosion inhibitors and as chemical intermediates for a wide variety of end products.

Obviously, many modifications and variations of the invention, as hereinbefore set forth, can be made without departing from the spirit and scope thereof, and therefore only such limitations should be imposed as are indicated in the appended claims.

We claim:

1. In a process of preparing primary and secondary amines wherein an amine selected from the group consisting of ammonia and a primary amine is reacted with a secondary alcohol in the presence of a catalyst selected from the group consisting of nickel, cobalt and barium-promoted copper chromite at a temperature of about 75° to 200° C. and about atmospheric pressure, the improvement which comprises maintaining in contact with said alcohol at least the stoichiometric amount of said amine required to react with the reactant alcohol during the reaction period to obtain the next higher substituted amine than said charge amine.

2. The process of claim 1 wherein said catalyst is nickel.

3. The process of claim 1 wherein said catalyst is cobalt.

4. The process of claim 1 wherein said catalyst is barium-promoted copper chromite.

5. The process of claim 1 wherein said amine is ammonia.

6. The process of claim 1 wherein said amine is a primary amine.

7. The process of claim 1 wherein said amine is methylamine.

8. The process of claim 1 wherein the alcohol is 2-octanol.

References Cited

UNITED STATES PATENTS

| | | | |
|---|---|---|---|
| 2,365,721 | 12/1944 | Olin et al. | 260—585 |
| 2,519,560 | 8/1950 | Fowler et al. | 260—585 |
| 2,953,601 | 9/1960 | Whitaker | 260—585 |
| 3,152,185 | 10/1964 | Zvejnieks | 260—583 |
| 3,223,734 | 12/1965 | Fallstad et al. | 260—583 |
| 3,270,059 | 8/1966 | Winderl et al. | 260—583 |

FLOYD D. HIGEL, *Primary Examiner.*

UNITED STATES PATENT OFFICE
CERTIFICATE OF CORRECTION

Patent No. 3,366,687                        January 30, 1968

Alan F. Ellis et al.

It is certified that error appears in the above identified patent and that said Letters Patent are hereby corrected as shown below:

Column 2, line 33, for "$R^1R^2CHNHR^3R^4$" read -- $R^1R^2CHNR^3R^4$ --. line 53, for "amines" read -- amine --; column 3, line 61, for "blow" read -- below --; column 4, line 57, for "at" read -- a --; column 8, line 24, after "would" insert -- not --; same column 8, TABLE IV, third column, line 6 thereof, for "4" read -- 5 --.

Signed and sealed this 24th day of June 1969.

(SEAL)

Attest:

Edward M. Fletcher, Jr.

Attesting Officer

WILLIAM E. SCHUYLER, JR.

Commissioner of Patents